United States Patent
Palenius et al.

(10) Patent No.: US 10,798,657 B2
(45) Date of Patent: Oct. 6, 2020

(54) POWER CONTROL IN HIGH SPEED SCENARIO

(71) Applicant: Telefonaktiebolaget LM Ericsson (publ), Stockholm (SE)

(72) Inventors: Torgny Palenius, Barseback (SE); Joakim Axmon, Kavlinge (SE); Magnus Larsson, Sollentuna (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 402 days.

(21) Appl. No.: 15/754,958

(22) PCT Filed: Dec. 3, 2015

(86) PCT No.: PCT/EP2015/078477
§ 371 (c)(1),
(2) Date: Feb. 23, 2018

(87) PCT Pub. No.: WO2017/032432
PCT Pub. Date: Mar. 2, 2017

(65) Prior Publication Data
US 2020/0252879 A1    Aug. 6, 2020

Related U.S. Application Data

(60) Provisional application No. 62/208,897, filed on Aug. 24, 2015.

(51) Int. Cl.
*H04W 52/14* (2009.01)
*H04W 52/24* (2009.01)
(Continued)

(52) U.S. Cl.
CPC ........... *H04W 52/143* (2013.01); *H04W 4/70* (2018.02); *H04W 52/242* (2013.01); *H04W 88/085* (2013.01)

(58) Field of Classification Search
CPC ... H04W 52/143; H04W 4/70; H04W 52/242; H04W 88/085; H04W 56/00; H04W 52/0206; H04W 72/1278; H04B 7/2678; H04L 5/0048; H04L 5/0053; H04L 5/0007; Y02D 70/449
See application file for complete search history.

(56) References Cited

U.S. PATENT DOCUMENTS

2001/0004604 A1    6/2001  Toshimitsu et al.
2007/0066329 A1*  3/2007  Laroia .................. H04L 5/0053
                                                                      455/502

OTHER PUBLICATIONS

PCT International Search Report, dated Mar. 14, 2016, in connection with International Application No. PCT/EP2015/078477, all pages.

(Continued)

Primary Examiner — Dady Chery
(74) Attorney, Agent, or Firm — Leffler Intellectual Property Law, PLLC

(57) ABSTRACT

At least one antenna node is controlled to provide power correction instructions to a wireless communication device at an appropriate time when switching between uplink reception radio lobes, irrespective of which direction the reception radio lobes are directed in relation to the direction of movement of the wireless communication device. Loss of data and receive blocking problems can thereby be at least mitigated.

19 Claims, 6 Drawing Sheets

(51) Int. Cl.
*H04W 88/08* (2009.01)
*H04W 4/70* (2018.01)

(56) References Cited

OTHER PUBLICATIONS

PCT Written Opinion, dated Mar. 14, 2016, in connection with International Application No. PCT/EP2015/078477, all pages.
3GPP TSG-RAN WG4 Meeting #74bis, R4-151365, Rio de Janiro, Brazil, Apr. 20-24, 2015, Ericsson, Modified arrangement for RRH based model, 3 pages.
3GPP TS 36.213 V12.6.0 (Jun. 2015), Section 5.1, Release 12, 33 pages.

* cited by examiner

POWER CONTROL IN HIGH SPEED SCENARIO

TECHNICAL FIELD

Embodiments herein relate to wireless communication and more specifically to transmission power control in a scenario where a wireless communication device is moving along a path.

BACKGROUND

Wireless communication systems, i.e. systems that provide communication services to wireless communication devices such as mobile phones, smartphones (often denoted by UE that is short for user equipment) as well as machine-type communication (MTC) devices, have evolved during the last decade into systems that must utilize the radio spectrum and other system resources in the most efficient manner possible. A reason for this is the ever increasing demand for high speed data communication capabilities in terms of, e.g., bitrate and to provide these capabilities at any given time, at any geographical location and also in scenarios where the wireless communication device is moving at a high speed, e.g., on board a high speed train.

To meet this demand, within the third generation partnership project (3GPP) work is being done regarding possible enhancements to radio resource management, RRM, performance in high speed train (HST) environments. The justification is that there are railways such as Japan Tohoku Shinkansen (running at 320 km/h), German ICE (330 km/h), AGV Italo (400 km/h), and Shanghai Maglev (430 km/h) at which vehicles travel at greater speed than 300 km/h and where there is demand for using mobile services.

For example, in R4-151365 (3GPP TSG-RAN WG4 Meeting #74bis, Rio de Janeiro, Brazil, 20-24 Apr., 2015) a unidirectional antenna scenario was proposed.

The scenario comprises cells consisting of multiple remote radio heads (RRHs) along a railway track, with downlink transmission (DLTX) antennas/radio lobes and uplink reception (ULRX) antennas/radio lobes, respectively, pointing in the same direction. This is illustrated in FIG. 1a, where a wireless communication device 101 is onboard a west moving high speed train 102 on a railway track 151. A first antenna node 110, which may be in the form of a RRH, maintains radio lobes including a transmission radio lobe 111, i.e. a downlink (DL) transmission (TX) DLTX lobe, and a reception radio lobe 112, i.e. an uplink (UL) reception (RX) ULRX lobe. Similarly, a second antenna node 120 maintains radio lobes including a transmission radio lobe 121, i.e. a DLTX lobe, and a reception radio lobe 122, i.e. an ULRX lobe. Similarly, a third antenna node 130 maintains radio lobes including a transmission radio lobe 131, i.e. a DLTX lobe, and a reception radio lobe 132, i.e. an ULRX lobe. As FIG. 1a illustrates, the transmission radio lobes 111, 121, 131 of the respective antenna nodes 110, 120, 130 are all in one and a same direction, i.e. due west, and the reception radio lobes 112, 122, 132 of the respective antenna nodes 110, 120, 130 are also all in one and a same direction, i.e. due west.

It is to be noted that there are actually two possibilities when it comes to unidirectional RRH arrangement for ULRX: ULRX and DLTX lobes or beams oriented in the same direction (as illustrated in FIG. 1a), and ULRX and DLTX lobes are oriented in opposite directions as illustrated in FIG. 1b. In FIG. 1b, ULRX lobes 112, 122, 132 are all in one direction (i.e. due east) that is opposing the direction of the DLTX lobes 111, 121, 131.

By unidirectional beam arrangement the perceived UL Doppler shift is essentially zero along the whole track, except close to the RRH sites, where it is not zero but reduced to a fraction of the maximum Doppler shift. See FIG. 2, where a scenario corresponding to that of FIG. 1b is illustrated.

In FIG. 2, panel 201 illustrates the UE moving along the track at 500 km/h approaching a RRH located at a position 1000 m in relation to RRH's located at positions 0 m and 2000 m. Panels 202, 203, 204, 205 show, respectively: 202, the path-loss that the UE experiences on downlink when receiving transmissions by the RRHs; 203, the frequency offset, defined as the difference between the frequency perceived at the UE receiver and the nominal frequency used by the RRH transmitter, due to Doppler shift associated with the strongest signal that the UE receives and which changes when the UE leaves one beam and enters the next; 204, the path-loss that the signal transmitted by the UE on the uplink undergoes before being received by the RRH; and 205, the frequency offset as received by the RRH, that is the difference between the perceived frequency at the RRH receiver and the nominal frequency; all are depending on the position of the UE between the RRHs.

Particularly, panels 203 and 205 show that although the UE experiences a nearly constant Doppler shift (about −1250 Hz, depending on the relative speed between the UE and the RRH), due to the network arrangement, the RRH will experience a nearly zero frequency offset in the signals received on the uplink. The reason is that the UE is not aware of its Doppler shift but uses the received DL carrier as a reference. Thus, the UE tunes its transmitter to a reference shifted down with the Doppler shift, since the UE is moving from the RRH of the downlink lobe. The frequency sent by the UE transmitter is then perceived by the RRH shifted up with the same Doppler shift, since the UE is moving towards the RRH of the uplink lobe. In this RRH arrangement there will therefore not be any difference in the frequency offset characteristics of the RRHs with regard to a stationary UE, a UE moving at high speed in a first direction, and a UE moving at high speed in a second direction. Thus the effect of Doppler shifts is annihilated on the uplink.

Moreover, panels 202 and 204 show the path-loss which is opposite on the downlink and the uplink as a consequence of the RRH arrangement with downlink and uplink beams oriented in opposite directions. Legacy UE behavior for power control assumes that the path-loss on uplink follows that of the path-loss on downlink. Hence as illustrated by panels 202 and 204 there are complications with scenarios where a unidirectional deployment is used and where the ULRX and DLTX lobes are oriented in opposite directions.

SUMMARY

In view of the above, an object of the present disclosure is to overcome or at least mitigate at least some of the drawbacks related to prior art HST scenarios where unidirectional radio lobes are used.

This is achieved in a first aspect by a method performed by a network node. The network node is connected to a plurality of antenna nodes that are located along a path where a wireless communication device is moving. The method comprises controlling the antenna nodes to maintain a respective reception radio lobe substantially along the path such that the wireless communication device during movement along the path, can communicate with the network node via consecutive reception radio lobes. A determination is made that the wireless communication device is about to move out of a current reception radio lobe and move into a subsequent reception radio lobe. As a consequence of this determination, at least one antenna node is controlled to provide an instruction at a specific point in time to the wireless communication device to perform a correction of transmission power.

The determination that the wireless communication device is about to move out of a current reception radio lobe and move into a subsequent reception radio lobe may in various embodiments comprise a determination of a position of the wireless communication device, the position being in relation an antenna node that maintains the current reception radio lobe and an antenna node that maintains the subsequent reception radio lobe. Further embodiments include ways in which the position may be determined based on various parameters and measurements. Such embodiments will be described in more detail below.

In some embodiments, the instruction to the wireless communication device to perform a correction of transmission power comprises a new power control command in any of a physical downlink control channel, PDCCH, an enhanced physical downlink control channel, E-PDCCH and a machine-type communications physical downlink control channel, M-PDCCH. In other embodiments, the instruction to the wireless communication device to perform a correction of transmission power comprises a plurality of transmitter power control, TPC, commands in any of a physical downlink control channel, PDCCH, an enhanced physical downlink control channel, E-PDCCH, and a machine-type communications physical downlink control channel, M-PDCCH, wherein said TPC command comprises a power correction value of 4 dB. That is, embodiments include both the use of a new power control command as well as the use of repeated legacy power control commands.

The embodiments involving the use of a new power control command may, in some embodiments, comprise a determination of a first path loss associated with the current reception radio lobe and a second path loss associated with the subsequent reception radio lobe. The new power control command may then comprise a power correction value that is based on a difference between the first and the second path loss.

In some of the embodiments involving the use of a new power control command, wherein the current reception radio lobe and the subsequent reception radio lobe are ahead of the wireless communication device, the specific point in time to provide an instruction to perform a correction of transmission power is subsequent to a point in time when the wireless communication device leaves the current reception radio lobe and the power correction value is in these embodiments positive. In other embodiments involving the use of a new power control command, wherein the current reception radio lobe and the subsequent reception radio lobe are behind the wireless communication device, the specific point in time to provide an instruction to perform a correction of transmission power is prior to a point in time when the wireless communication device enters the subsequent reception radio lobe and the power correction value is in these embodiments negative.

In some of the embodiments involving the use of a TPC command, i.e. a legacy power control command, wherein the current reception radio lobe and the subsequent reception radio lobe are ahead of the wireless communication device, the specific point in time to provide an instruction to perform a correction of transmission power is such that the plurality of TPC commands are initiated subsequent to a point in time when the wireless communication device leaves the current reception radio lobe and the power correction value is in these embodiments positive. In other embodiments involving the use of a TPC command, wherein the current reception radio lobe and the subsequent reception radio lobe are behind the wireless communication device, the specific point in time to provide an instruction to perform a correction of transmission power is such that the plurality of TPC commands are initiated is prior to a point in time when the wireless communication device enters the subsequent reception radio lobe and the power correction value is in these embodiments negative.

In other words, embodiments of the present disclosure enable a fast power adjustment which for example minimizes loss of data and receiver blocking problems. That is, by controlling the at least one antenna nodes to provide power correction instructions to a wireless communication device at an appropriate time when switching between uplink reception radio lobes, irrespective of which direction the reception radio lobes are directed in relation to the direction of movement of the wireless communication device, loss of data and receiver blocking problems can be at least mitigated.

In another aspect there is provided a network node configured to be connected to a plurality of antenna nodes that are located along a path where a wireless communication device is moving. The network node comprises input/output circuitry, a processor and a memory. The memory contains instructions executable by said processor whereby the network node is operative to:

control the antenna nodes to maintain a respective reception radio lobe substantially along the path such that the wireless communication device during movement along the path, can communicate with the network node via consecutive reception radio lobes, determine that the wireless communication device is about to move out of a current reception radio lobe and move into a subsequent reception radio lobe and, as a consequence of said determination:

control at least one antenna node to provide an instruction at a specific point in time to the wireless communication device to perform a correction of transmission power.

In another aspect there is provided a computer program, comprising instructions which, when executed on at least one processor in a network node, cause the network node to carry out the method as summarized above in connection with the first aspect and the various embodiments of this aspect.

In another aspect there is provided a carrier comprising a computer program according to the summarized aspect above, wherein the carrier is one of an electronic signal, an optical signal, a radio signal and a computer readable storage medium.

These other aspects provide the same effects and advantages as summarized above in connection with the method of the first aspect.

DETAILED DESCRIPTION

Figure 1A:
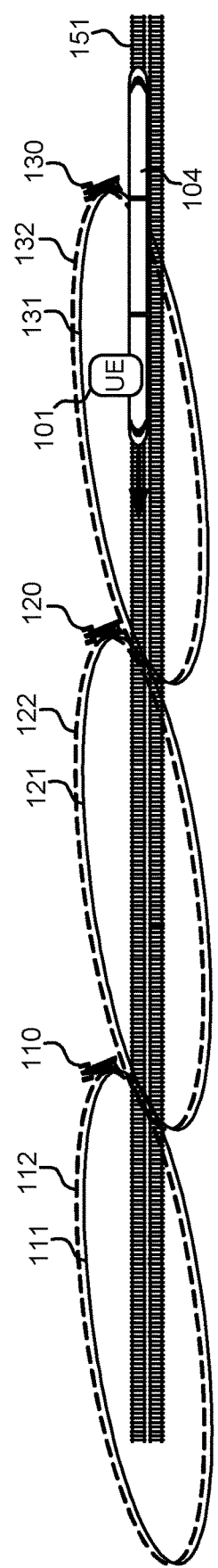
FIGS. 1a and 1b schematically illustrate HST scenarios.
Figure 1B:
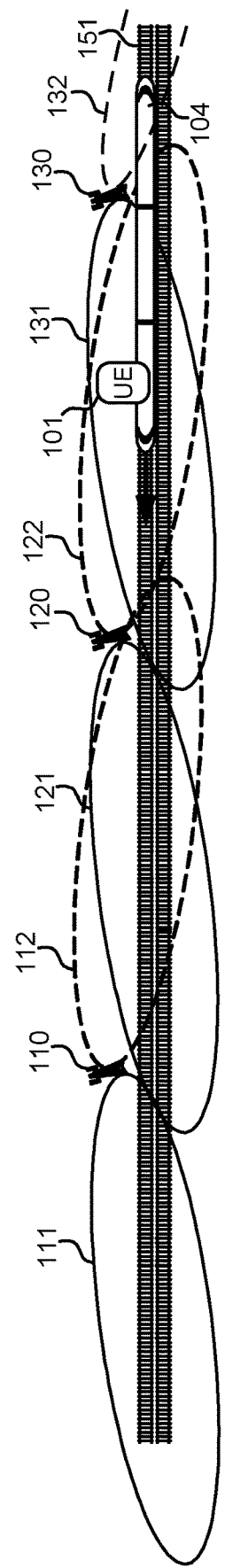
Figure 2:
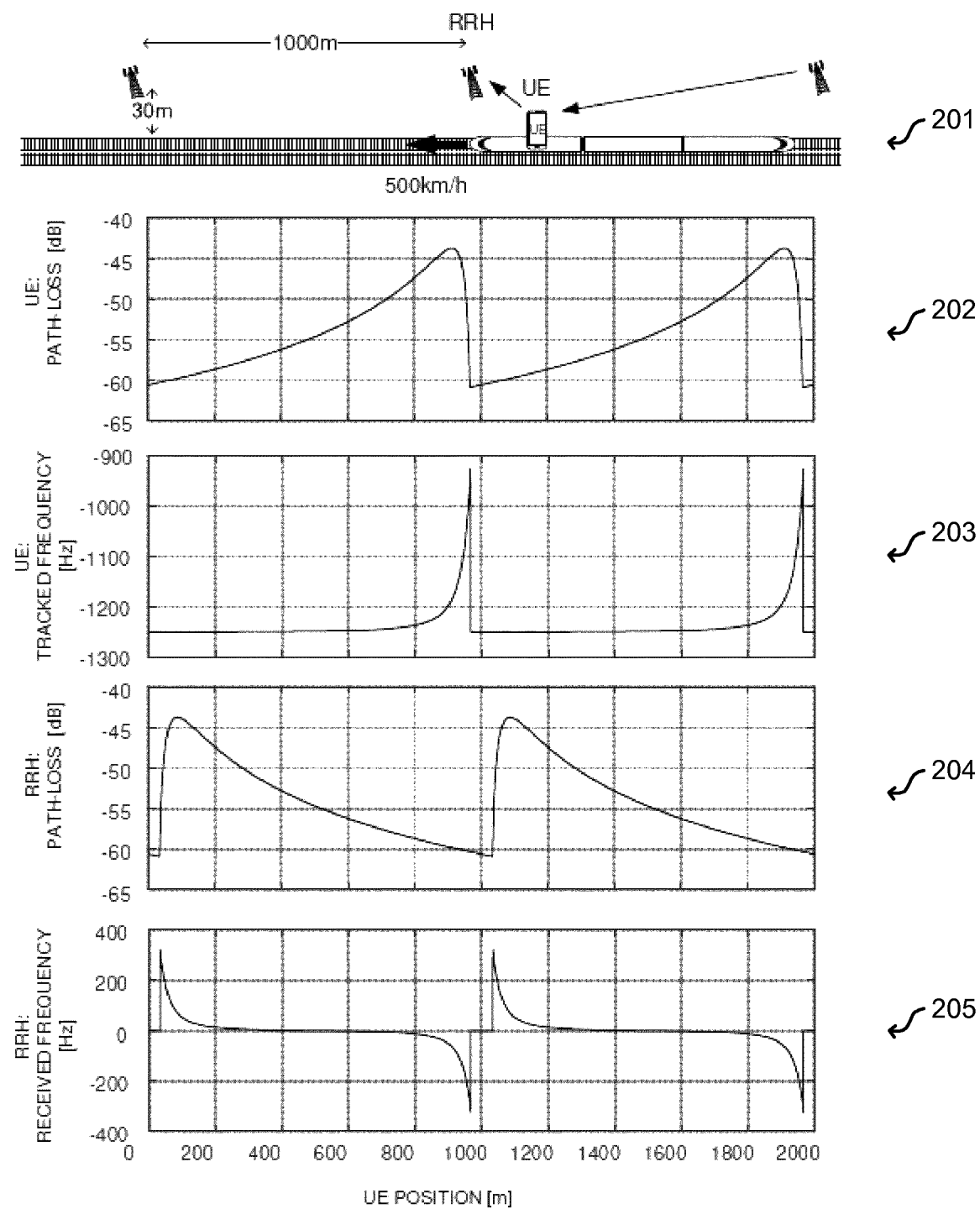
FIG. 2 shows graphs that illustrate radio signal measurements.

Referring back to the scenario illustrated in FIG. 1b, when the UL and DL are transmitted in different lobe directions and the UL is transmitted in the same direction as the train 104 and the wireless communication device 101 are moving towards the RRH 120 in front of the wireless communication device 101 and the DL is transmitted from the RRH 130 behind the wireless communication device 101 (also in the same direction as the wireless communication device 101 and the train is moving), the UL path loss is decreasing within a RRH coverage (top of the curves in FIG. 2) until it passes the RRH 120 and the wireless communication device 101 enters the coverage of the next RRH 110. When passing the coverage border the UL power shall be decreased with the difference of the path loss. Furthermore the wireless communication device 101 gets the information from the DL RRH behind the wireless communication device 101. It is to be noted that, in the present disclosure, the expression "coverage border" is to be understood as corresponding to a position where a wireless communication device, in its movement along a path, moves out of a current reception radio lobe and into a subsequent reception radio lobe.

Propagation loss (i.e. path loss, as exemplified in FIG. 2) can be quite large so the power must be adjusted with the same amount when changing cell (e.g. changing from ULRX lobe 122 to ULRX lobe 112, as illustrated in FIG. 1b). A 1000 m propagation loss when the power is decreasing with the square of the distance and the minimum distance is 10 m becomes 40 dB loss.

For example, the network (NW) can control the UL power in a 3GPP long term evolution (LTE) network, as stated in 3GPP TS 36.213, section 5.1. This is based on a TPC command $\delta_{PUSCH,c}$ which controls the power every sub-frame as stated in TS 36.213 and copied below.

If the wireless communication device 101 transmits a physical uplink shared channel (PUSCH) without a simultaneous a physical uplink control channel (PUCCH) for the serving cell c(i.e., serving cell corresponding to the ULRX lobe in which the wireless communication device 101 is transmitting), then the wireless communication device 101 transmit power $P_{PUSCH,c}(i)$ for PUSCH transmission in sub-frame i for the serving cell c is given by:

$$P_{PUSCH,c}(i) = \min \begin{Bmatrix} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix}$$

[dBm]

If the UE transmits PUSCH simultaneously with PUCCH for the serving cell c, then the wireless communication device 101 transmit power $P_{PUSCH,c}(i)$ for the PUSCH transmission in sub-frame i for the serving cell c is given by:

$$P_{PUSCH,c}(i) = \min \begin{Bmatrix} 10\log_{10}\left(\hat{P}_{CMAX,c}(i) - \hat{P}_{PUCCH}(i)\right), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix}$$

[dBm]

$\delta_{PUSCH,c}$ is a correction value, also referred to as a TPC command and is included in a physical downlink control channel/evolved physical downlink control channel (PD-CCH/EPDCCH) with a downlink control information (DCI) format 0/4 for serving cell c or jointly coded with other TPC commands in PDCCH with DCI format 3/3A whose cyclic redundancy check (CRC) parity bits are scrambled with TPC-PUSCH-Radio Network Temporary Identifier (RNTI). If the wireless communication device 101 is configured with higher layer parameter UplinkPowerControlDedicated-v12x0 for serving cell c and if sub-frame i belongs to uplink power control sub-frame set 2 as indicated by the higher layer parameter tpc-SubframeSet-r12, the current PUSCH power control adjustment state for serving cell c is given by $f_{c,2}(i)$, and the wireless communication device 101 shall use $f_{c,2}(i)$ instead of $f_c(i)$ to determine $P_{PUSCH,c}(i)$. Otherwise, the current PUSCH power control adjustment state for serving cell c is given by $f_c(i)$. $f_{c,2}(i)$ and $f_c(i)$ are defined by: $f_c(i)=f_c(i-1)+\delta_{PUSCH,c}(-K_{PUSCH})$ and $f_{c,2}(i)=f_{c,2}(i-1)+\delta_{PUSCH,c}(i-K_{PUSCH})$ if accumulation is enabled based on the parameter Accumulation-enabled provided by higher layers or if the TPC command $\delta_{PUSCH,c}$ is included in a PDCCH/EPDCCH with DCI format 0 for serving cell c where the CRC is scrambled by the Temporary C-RNTI.

$\delta_{PUSCH,c}$ can have the following values:

| TPC command field in DCI format 0/3/4 | Accumulated $\delta_{PUSCH,c}$ [dB] | Absolute $\delta_{PUSCH,c}$ [dB] only DCI format 0/4 |
|---|---|---|
| 0 | −1 | −4 |
| 1 | 0 | −1 |
| 2 | 1 | 1 |
| 3 | 3 | 4 |

When a network node takes actions to change the RRH which is used for the UL communication since the wireless communication device 101 is passing the current RRH (e.g. antenna node 120 in FIG. 1b), the UL power transmitted by the wireless communication device 101 will not be sufficient to reach the next RRH (e.g. antenna node 110 in FIG. 1b). Therefore the UL power must be increased since the path-loss to the new (i.e. next) RRH is much larger than to the former (i.e. current) one. The wireless communication device 101 will not be able to adapt the power based on the DL path-loss either since the UL and DL are not connected to the same RRH. In this case the UL and DL lobes are directed in different directions.

In the other case (as exemplified in FIG. 1a) the UL lobes (132, 122, 112) are directed in the same direction as the DL lobes (131, 121, 111), with transmission in the opposite direction as the wireless communication device 101 and the train 104 are moving. Then the wireless communication device 101 is connected to the new RRH (i.e. antenna node 120 in FIG. 1a) when it is passing it and is very close to the RRH 120. The UL power to the previous RRH (i.e. antenna node 130 in FIG. 1a) is quite high due to the distance to the previous RRH 130. Then the transmission power in the wireless communication device 101 needs to be decreased suddenly before it enters the UL beam 122 of the new RRH 120. Otherwise the RRH 120 will be blocked by the high signal level. Thus, this is the same problem but probably even more urgent since the high RX power in the base station will block the receiver and the base station will not be able to receive any data at all (remembering that "base station" may correspond to antenna node in the present disclosure).

Such, and other, embodiments will now be described and illustrated with reference to FIG. 3 and FIG. 4.

Figure 3:
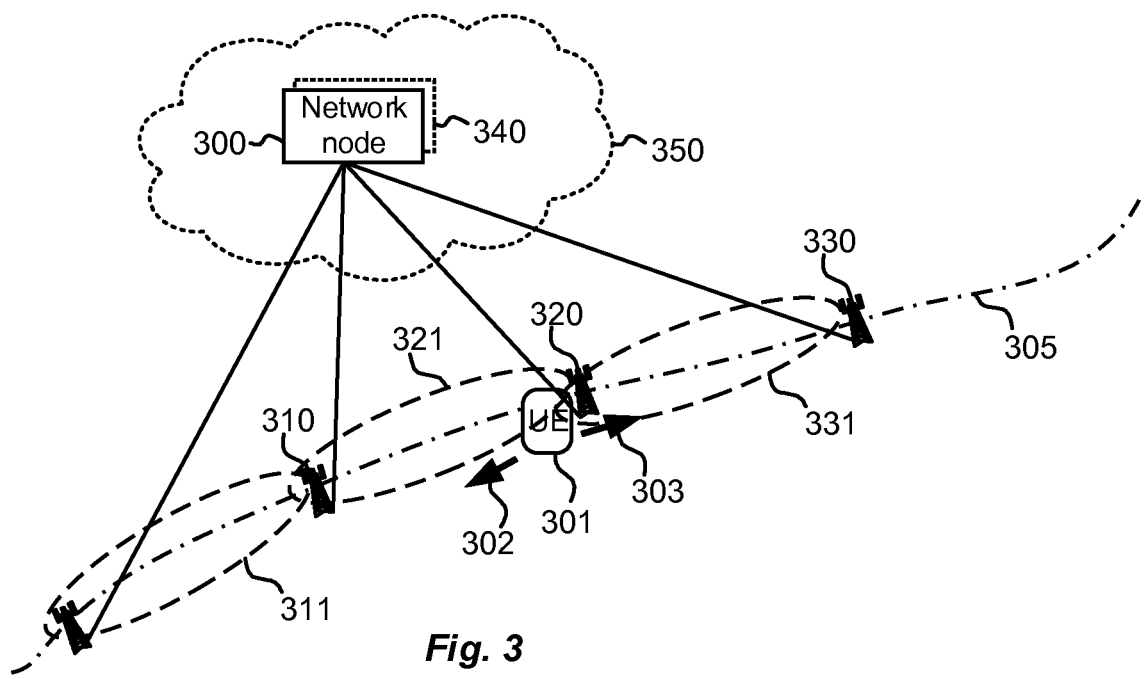
FIG. 3 schematically illustrates a network node, antenna nodes and a wireless communication device.

In FIG. 3, a network node 300 is connected to a plurality of antenna nodes 310, 320, 330 that are located along a path 305 where a wireless communication device 301 is moving, the movement illustrated by a velocity vector 302 in a first movement direction and a velocity vector 303 in a second movement direction that is opposite the first movement direction. The antenna nodes 310, 320, 330 are controlled to maintain a respective reception radio lobe 311, 321, 331. As the skilled person will realize, the antenna nodes 310, 320, 330 may also maintain respective transmission radio lobes. Such transmission radio lobes are omitted from FIG. 3 for the sake of avoiding unnecessary detail when illustrating the embodiments of the present disclosure. The lobes 311, 321, 331 are substantially along the path 305 such that the wireless communication device 301 during movement along the path 305, can communicate with the network node 300 via consecutive reception radio lobes. When moving in the direction defined by velocity vector 302, the wireless communication device 301 communicates via consecutive reception radio lobes 331, 321, 311 of consecutive antenna nodes 330, 320, 310 behind the wireless communication device 301. Conversely, when moving in the direction defined by velocity vector 303, the wireless communication device 301 communicates via consecutive reception radio lobes 311, 321, 331 of consecutive antenna nodes 310, 320, 330 ahead of the wireless communication device 301.

As indicated in FIG. 3, it is to be noted that the network node 300 may be considered as a single entity as well as a combination of a plurality of entities 340. For example, the network node 300 may be distributed, in terms of functionality as well as in terms of physical hardware, over one or more processing units that are residing in a logical entity 350 that may be defined as a "cloud".

As will be exemplified below, the network node 300 may also be in the form of a node in a 3GPP long term evolution (LTE) system.

Figure 4:
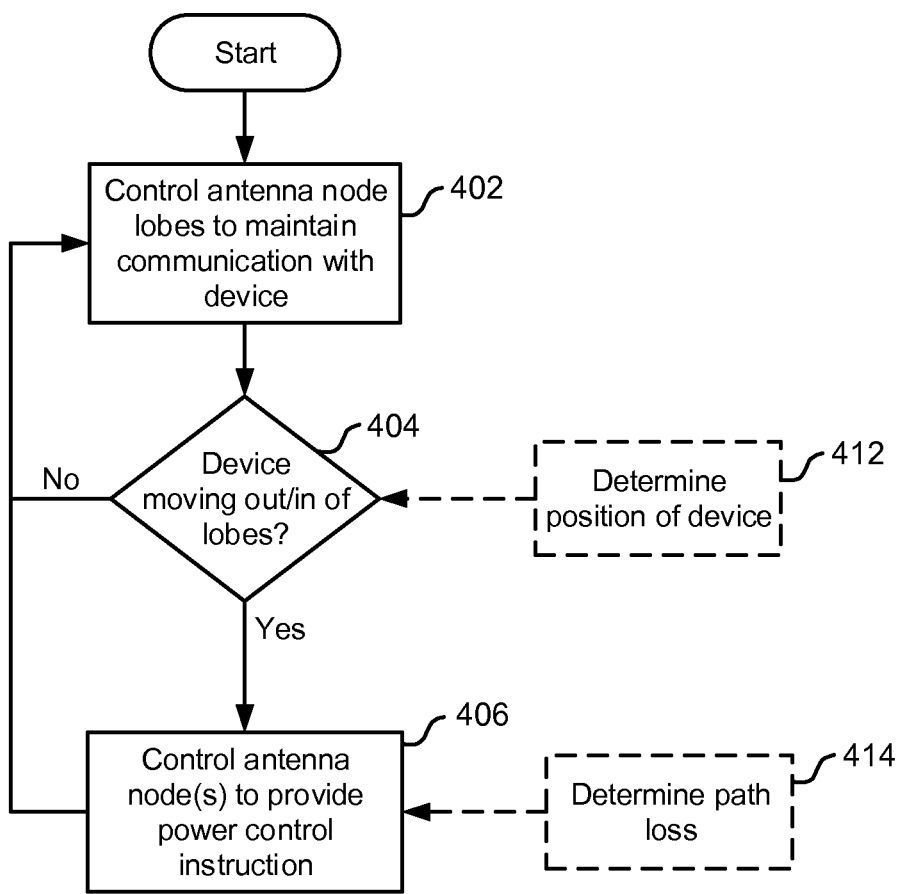
FIG. 4 is a flowchart of a method, FIG. 5 schematically illustrates a wireless communication system, FIG. 6 schematically illustrates functional blocks in a network node and in antenna nodes, FIG. 7 schematically illustrates a network node, and FIG. 8 schematically illustrates a network node.

Turning now to FIG. 4, and with continued reference to FIG. 3, a method will be described with reference to a number of actions that are performed by a network node, such as the network node 300.

In some embodiments, the wireless communication device 301 moves in the direction defined by the velocity vector 302 and in such embodiments, antenna node 320 may be considered to be maintaining a current reception radio lobe 321 and antenna node 310 may be considered to be maintaining a subsequent reception radio lobe 311.

Moreover, in some embodiments, the wireless communication device 301 moves in the direction defined by the velocity vector 303 and in such embodiments, antenna node 320 may be considered to be maintaining a current reception radio lobe 321 and antenna node 330 may be considered to be maintaining a subsequent reception radio lobe 331.

Action 402

The antenna nodes 310, 320, 330 are controlled to maintain a respective reception radio lobe 311, 321, 331. The lobes 311, 321, 331 are substantially along the path 305 such that the wireless communication device 301 during movement along the path 305, can communicate with the network node 300 via consecutive reception radio lobes 311, 321, 331.

Action 404

A determination is made that the wireless communication device 301 is about to move out of a current reception radio lobe and move into a subsequent reception radio lobe.

For example, the determination that the wireless communication device 301 is about to move out of a current reception radio lobe and move into a subsequent reception radio lobe may in some embodiments comprise determining a position of the wireless communication device, as illustrated by action 412, said position being in relation an antenna node that maintains the current reception radio lobe and an antenna node that maintains the subsequent reception radio lobe.

In such embodiments, the determination of a position of the wireless communication device 301 may comprise determining a speed with which it is moving along the path and the position may then be determined by analysing the determined speed in relation to information about a position of at least one of the antenna nodes 310, 320, 330. In these embodiments, the speed may be determined from an analysis of Doppler radio frequency characteristics associated with radio frequency, RF, signals received from the wireless communication device 301. The speed may also be determined by analysing levels of received power of RF signals received from the wireless communication device 301, the analysis comprising analysis of periodicity and phase of received power in relation to information about a plurality of positions of respective antenna nodes 310, 320, 330. Another way of determining the speed of the wireless communication device 301 is to analyse information comprised in block error rate (BLER) reports received from the wireless communication device 301, the analysis comprising analysis of periodicity and phase of BLER in relation to information about a plurality of positions of respective antenna nodes 310, 320, 330.

Action 406

At least one antenna node 310, 320, 330 is controlled to provide an instruction at a specific point in time to the wireless communication device 301 to perform a correction of transmission power.

As the skilled person will realize, a specific point in time may be expressed in terms of a specific sub-frame.

In some embodiments, the instruction to the wireless communication device 301 to provide an instruction to perform a correction of transmission power comprises a new power control command in any of a physical downlink control channel, PDCCH, an enhanced physical downlink control channel, E-PDCCH and a machine-type communications physical downlink control channel, M-PDCCH. Such embodiments may comprise determining a first path loss associated with the current reception radio lobe and a second path loss associated with the subsequent reception radio lobe, as illustrated by action 414. The new power control command may then comprise a power correction value that is based on a difference between the first and the second path loss.

In embodiments wherein the current reception radio lobe and the subsequent reception radio lobe are ahead of the wireless communication device (i.e. embodiments where the wireless communication device 301 is moving in the direction illustrated by velocity vector 303 and the current lobe is lobe 321 and the subsequent lobe is lobe 331), the specific point in time to provide an instruction to perform a correction of transmission power may be subsequent to a point in time when the wireless communication device leaves the current reception radio lobe, and the power correction value may then be positive.

Alternatively, in embodiments wherein the current reception radio lobe and the subsequent reception radio lobe are behind the wireless communication device (i.e. embodiments where the wireless communication device 301 is moving in the direction illustrated by velocity vector 302 and the current lobe is lobe 321 and the subsequent lobe is lobe 311), the specific point in time to provide an instruction to perform a correction of transmission power may be prior to a point in time when the wireless communication device enters the subsequent reception radio lobe, and the power correction value may then be negative.

According to prior art, i.e. by use of legacy 3GPP procedures, power control cannot take steps bigger than 4 dB per sub-frame so it takes some time to account for e.g. 40 dB path loss (as exemplified above). Then the new power control command is required for this big step. Once the wireless communication device 301 is close to the switch between the current and the subsequent RRH (antenna node), the network node 300 signals to the wireless communication device 301, with this new power control command the wireless communication device 301 to increase/decrease the PDSCH power (and/or PDCCH power and/or M-PDCCH power) with start in a specific sub-frame.

The switch of power when the power is increased needs to be done after the wireless communication device 301 has left the coverage of the previous cell (i.e. current reception radio lobe 321) in order to not block the radio receiver of the previous cell (i.e. a receiver in the antenna node 320 that maintains the current reception radio lobe 321). The switch of power when the power is decreased needs to be done before the UE enters the coverage of the next cell (i.e. subsequent reception radio lobe 311) in order not to block the radio receiver of the new cell (i.e. a receiver in an antenna node 310 that maintains the subsequent reception radio lobe 311). Thereby, after this switch, the transmission power in the wireless communication device 301 is in a level that is possible for receivers on the NW side to receive without blocking the receiver when entering a new RRH (i.e. entering a subsequent reception radio lobe).

Alternatively, instead of utilizing a new power control command, in some embodiments the instruction to the wireless communication device 301 to provide an instruction to perform a correction of transmission power may comprise a plurality of transmitter power control, TPC, commands in any of a physical downlink control channel, PDCCH, an enhanced physical downlink control channel, E-PDCCH, and a machine-type communications physical downlink control channel, M-PDCCH. The TPC command may then comprise a power correction value of 4 dB.

In embodiments wherein the current reception radio lobe and the subsequent reception radio lobe are ahead of the wireless communication device (i.e. embodiments where the wireless communication device 301 is moving in the direction illustrated by velocity vector 303 and the current lobe is lobe 321 and the subsequent lobe is lobe 331), the specific point in time to provide an instruction to perform a correction of transmission power may be such that the plurality of TPC commands are initiated subsequent to a point in time when the wireless communication device leaves the current reception radio lobe, and the power correction value may then be positive.

Alternatively, in embodiments wherein the current reception radio lobe and the subsequent reception radio lobe are behind the wireless communication device (i.e. embodiments where the wireless communication device 301 is moving in the direction illustrated by velocity vector 302 and the current lobe is lobe 321 and the subsequent lobe is lobe 311), the specific point in time to provide an instruction to perform a correction of transmission power may be such that the plurality of TPC commands are initiated is prior to a point in time when the wireless communication device enters the subsequent reception radio lobe, and the power correction value may then be negative.

With regard to these embodiments where legacy 3GPP procedures may be utilized, in this case the signalling is not changed. When the wireless communication device 301 comes close to the switch to a new RRH which requires less power (i.e. subsequent reception radio lobe 311) the network node 300 signals maximum level down (4 dB) every sub-frame (decreasing the power level as fast as possible) with the legacy signalling in advance to the switching of RRH (i.e. prior to entering the subsequent lobe 311). On the other hand, in case the wireless communication device 301 enters the UL coverage (i.e. reception radio lobe 331) of the RRH that is far away(i.e. antenna node 330), the UL transmission power needs to be increased after the wireless communication device 301 has left the coverage of the previous RRH (i.e. current reception radio lobe 321) in order not to block the radio receiver of that RRH (i.e. a receiver in the antenna node 320 that maintains the current reception radio lobe 321). This adaptation of power is done in order to simplify the synchronization on the next RRH (i.e. an antenna node that maintains a subsequent reception radio lobe), speed up the switch without blocking the RRH radio receiver. There may be some loss of data due to lacking UL coverage when the UL power is too low in the adaptation phase.

The above described embodiments of methods can be summarized in slightly alternative words, using a terminology where UE may be the wireless communication device 301, RRH may be any appropriate antenna node 310, 320, 330 and the network (NW) may be represented by a network node as described above.

Some embodiments may be expressed in terms of a method to adapt the UL output power from a UE when it changes coverage to a new RRH in a high speed scenario, wherein, if the UL lobe is ahead of the UE (RRH ahead of moving train), the NW signals to the UE, with a new power control command to the UE, to increase the output power (the PDSCH power and/or PDCCH power) with start in a specific sub-frame, and the switch of power is done after the UE has left the coverage of the previous cell.

Some embodiments may be expressed in terms of a method to adapt the UL output power from a UE when it changes coverage to a new RRH in a high speed scenario, wherein, if the UL lobe is behind the UE (RRH behind moving train), the NW signals to the UE, with a new power control command to the UE, to decrease the output power (the PDSCH power and/or PDCCH power) with start in a specific sub-frame, and the switch of power is done before the UE enters the coverage of the next cell in order not to block the radio receiver of the new cell.

Some embodiments may be expressed in terms of a method to adapt the UL output power from a UE when it changes coverage to a new RRH in a high speed scenario, wherein, if the UL lobe is ahead of the UE (RRH ahead of moving train), the NW signals to the UE maximum level up (4 dB) every sub-frame (increasing the power level as fast as possible) with the legacy signalling in advance of the switching of RRH.

Some embodiments may be expressed in terms of a method to adapt the UL output power from a UE when it changes coverage to a new RRH in a high speed scenario, wherein, if the UL lobe is behind the UE (RRH behind moving train), the NW signals to the UE maximum level down (4 dB) every sub-frame (decreasing the power level as fast as ossible) with the legacy signalling in advance of the switching of RRH.

Figure 5:
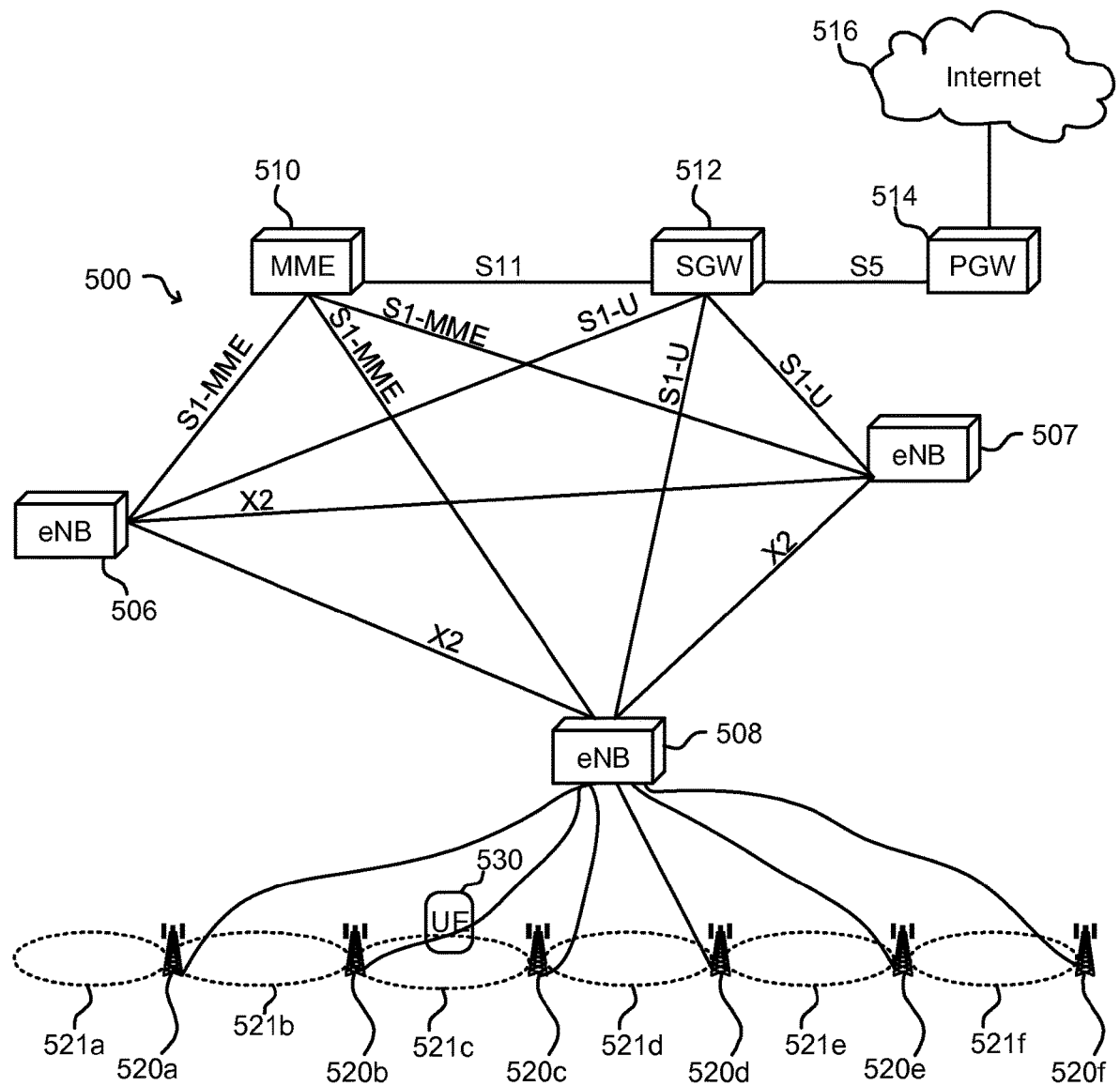

Turning now to FIG. 5, which illustrates parts of a 3GPP long term evolution, LTE, wireless network 500 and a compatible core network. Base stations (enhanced NodeB, eNodeB or eNB) 506, 507, 508 are communicating with each other over an X2 interface. The base stations 506, 507 and 508 are connected to a mobility management entity, MME, 510, which keeps information about UEs (i.e. UE contexts) regarding capabilities etc., which the MME 510 shares, e.g., with base stations connected to it. The MME 510 is also managing handover of a UE from one MME to another when a UE leaves the pool of base stations managed by a source MME, or when the X2 connection is missing between the source and target base stations.

The base stations 506, 507 and 508 are further connected to a serving gateway, SGW, 512, which is handing the user data plane transport to and from the base station to which a UE is connected, and to one or more packet data network gateways, PGW, 514, which connect UEs to the internet 516. The MME in whose pool of base stations a UE resides configures which base station the SGW shall connect to for transport of the UE user plane data.

In FIG. 5, the base station 508 is a network node as defined above and the base station/network node 508 is connected to a number of antenna nodes 520a-f. The base station/network node 508 controls the antenna nodes 520a-f as discussed herein and thereby maintaining respective radio lobes 521a-f. A UE 530 is illustrated, which may correspond to any UE described herein.

Control of UL transmission power levels, as exemplified above, may be handled by a single network node such as an eNodeB (as indicated in FIG. 5) using antenna nodes in the form of remote radio heads, RRH, or remote radio units, RRU, for the individual radio lobes 521a-f. Control of UL transmission power levels may in other embodiments be handled by a group of eNodeBs with or without RRHs or RRUs operating in a cooperative manner, or such group of eNodeBs under coordination of another network node, either a new entity or an existing one with extended functionality, e.g. an MME.

Figure 6:
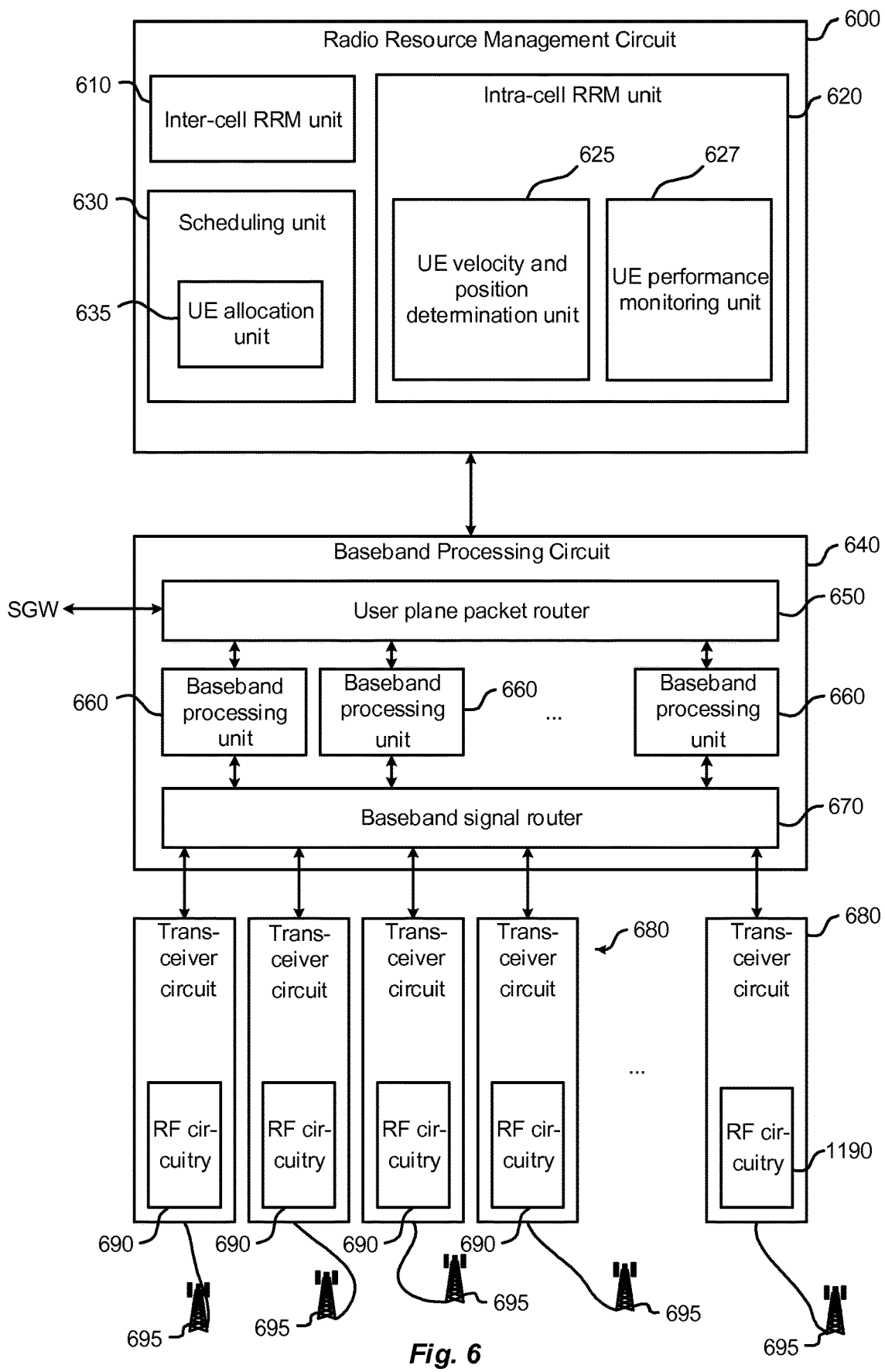

Turning now to FIG. 6, an example of arrangements, in the form of functional blocks, in a network node will be described in some more detail. The arrangements in FIG. 6 may be comprised in any of the network nodes discussed above in connection with FIGS. 3 and 5.

A radio resource management (RRM) circuit 600 comprises an Inter-cell RRM unit 610 for handling information and processing in relation to mobility of wireless communication devices between cells in a wireless communication network, e.g. a single frequency network (SFN), where cells may have one and the same or different physical cell identities.

An intra-cell RRM unit 620 is comprised in the RRM circuit 600, the intra-cell RRM unit 620 being capable of handling information and processing in relation to mobility within a cell (e.g. part of a SFN cell) managed by this network node, e.g. eNodeB.

A scheduling unit 630 is configured to, in addition to scheduling operations that are outside of the present disclosure, handle scheduling of communication as described herein.

A velocity and position determination unit 625 is configured to determine position and velocity of wireless communication devices based on various kinds of measurements (e.g. as discussed herein), and a UE performance monitoring unit 627 which monitors performance of wireless communication devices and collects statistics (e.g. BLER) on the performance based on reported capabilities or release, location and speed of the wireless communication devices. The acquired statistics can be used for determining where, with respect to position and speed of a wireless communication device to allocate a particular kind of wireless communication device.

A baseband processing unit 640 comprises one or more baseband processing units 660 connected to a SGW via a user plane packet router 650, and connected to transceiver circuits 680 comprising RF circuitry 690 via a baseband signal router 670. Connection with antenna nodes 695 is realized via the transceiver circuits 680.

Figure 7:
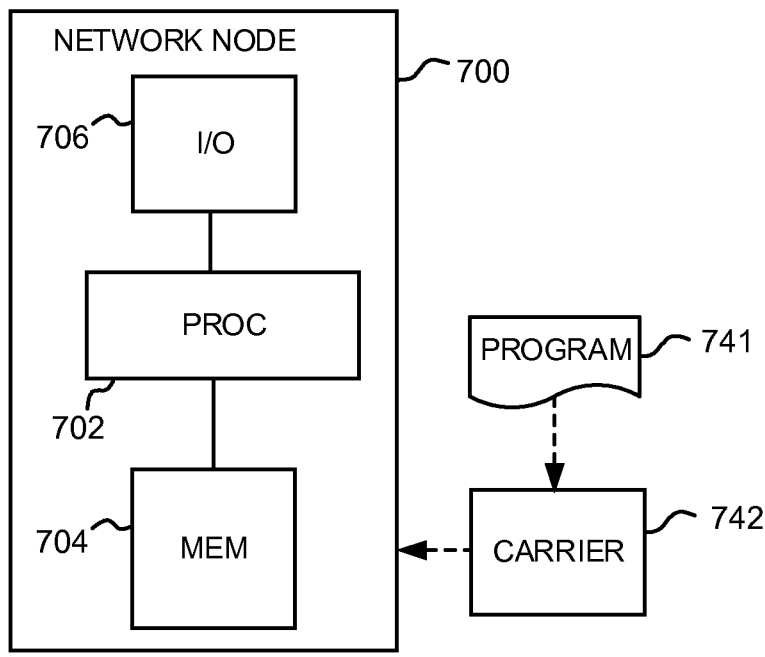

Turning now to FIG. 7, a schematically illustrated network node 700 will be described in some more detail. The network node 700 is configured to be connected to a plurality of antenna nodes that are located along a path where a wireless communication device is moving. The network node 700 comprises input/output circuitry 706, a processor 702 and a memory 704. The memory 704 contains instructions executable by the processor 702 whereby the network node 700 is operative to:

control the antenna nodes to maintain a respective reception radio lobe substantially along the path such that the wireless communication device during movement along the path, can communicate with the network node via consecutive reception radio lobes, determine that the wireless communication device is about to move out of a current reception radio lobe and move into a subsequent reception radio lobe and, as a consequence of said determination:

control at least one antenna node to provide an instruction at a specific point in time to the wireless communication device to perform a correction of transmission power.

The instructions that are executable by the processor 702 may be software in the form of a computer program 741. The computer program 741 may be contained in or by a carrier 742, which may provide the computer program 741 to the memory 704 and processor 702. The carrier 742 may be in any suitable form including an electronic signal, an optical signal, a radio signal or a computer readable storage medium.

In some embodiments, the network node 700 is operative such that the determination that the wireless communication device is about to move out of a current reception radio lobe and move into a subsequent reception radio lobe comprises:

determining a position of the wireless communication device, said position being in relation an antenna node that maintains the current reception radio lobe and an antenna node that maintains the subsequent reception radio lobe.

In some embodiments, the network node 700 is operative such that the instruction to the wireless communication device to perform a correction of transmission power comprises a new power control command in any of a physical downlink control channel, PDCCH, an enhanced physical downlink control channel, E-PDCCH and a machine-type communications physical downlink control channel, M-PD-CCH.

In some embodiments, the network node 700 is operative to:

determine a first path loss associated with the current reception radio lobe and a second path loss associated with the subsequent reception radio lobe and wherein the new power control command comprises a power correction value that is based on a difference between the first and the second path loss.

In some embodiments, the network node 700 is operative such that the current reception radio lobe and the subsequent reception radio lobe are ahead of the wireless communication device and operative such that:

said specific point in time to provide an instruction to perform a correction of transmission power is subsequent to a point in time when the wireless communication device leaves the current reception radio lobe, and the power correction value is positive.

In some embodiments, the network node 700 is operative such that the current reception radio lobe and the subsequent reception radio lobe are behind the wireless communication device and operative such that:

said specific point in time to provide an instruction to perform a correction of transmission power is prior to a point in time when the wireless communication device enters the subsequent reception radio lobe, and the power correction value is negative.

In some embodiments, the network node 700 is operative such that the instruction to the wireless communication device to perform a correction of transmission power comprises a plurality of transmitter power control, TPC, commands in any of a physical downlink control channel, PDCCH, an enhanced physical downlink control channel, E-PDCCH, and a machine-type communications physical downlink control channel, M-PDCCH, wherein said TPC command comprises a power correction value of 4 dB.

In some embodiments, the network node 700 is operative such that the current reception radio lobe and the subsequent reception radio lobe are ahead of the wireless communication device and operative such that:

said specific point in time to provide an instruction to perform a correction of transmission power is such that the plurality of TPC commands are initiated subsequent to a point in time when the wireless communication device leaves the current reception radio lobe, and the power correction value is positive.

In some embodiments, the network node 700 is operative such that the current reception radio lobe and the subsequent reception radio lobe are behind the wireless communication device and operative such that:

said specific point in time to provide an instruction to perform a correction of transmission power is such that the plurality of TPC commands are initiated is prior to a point in time when the wireless communication device enters the subsequent reception radio lobe, and the power correction value is negative.

Figure 8:
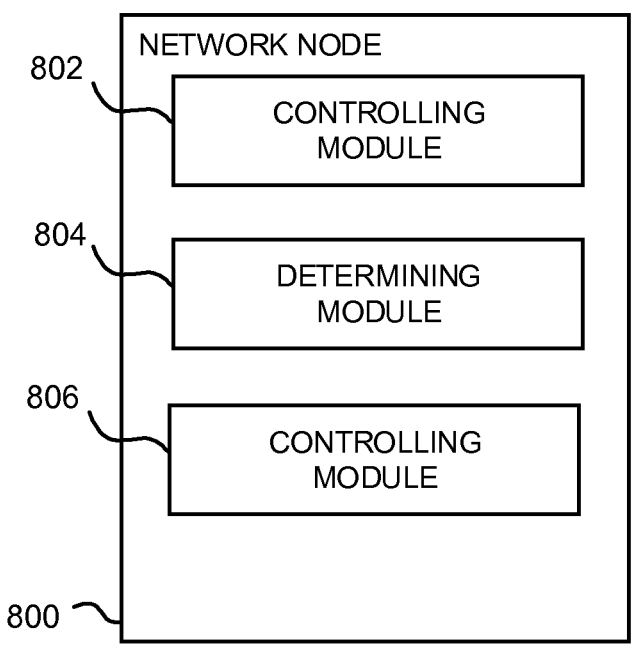

FIG. 8, illustrates schematically a network node 800 that comprises:

a controlling module 802 configured to control antenna nodes to maintain a respective reception radio lobe substantially along the path such that the wireless communication device during movement along the path, can communicate with the network node via consecutive reception radio lobes, a determining module 804 configured to determine that the wireless communication device is about to move out of a current reception radio lobe and move into a subsequent reception radio lobe and, a controlling module 806 configured to, as a consequence of said determination, control at least one antenna node to provide an instruction at a specific point in time to the wireless communication device to perform a correction of transmission power.

The network node 800 may comprise further modules that are configured to perform in a similar manner as, e.g., the network node 700 described above in connection with FIG. 7.

In case it is not clear from the context in which they appear, below follows a summary of abbreviations of some of the technical terms used in the description above.

| Abbreviation | Explanation |
| --- | --- |
| BBPU | Baseband processing unit |
| C-RNTI | Cell radio network temporary identifier |
| DL | Downlink |
| DRX | Discontinuous reception |
| eNB | evolved NodeB |
| FDD | Frequency division duplex |
| FFT | Fast Fourier transform |
| HST | High speed train |
| PRACH | Physical random access channel |
| PUCCH | Physical uplink control channel |
| PUSCH | Physical uplink shared channel |
| RA | Random access |
| RAU | Remote antenna unit |
| RLF | Radio link failure |
| RRH | Remote radio head |
| Rx | Receive(r) |
| SG | Scheduling grant |
| SR | Scheduling request |
| TA | Timing advance |
| TDD | Time division duplex |
| TRx | Transceiver |
| Tx | Transmit(ter) |
| UE | User equipment |
| UL | Uplink |

The invention claimed is:

1. A method performed by a network node, where the network node is connected to a plurality of antenna nodes that are located along a path where a wireless communication device is moving, the method comprising:

controlling the antenna nodes to maintain a respective reception radio lobe along the path such that the wireless communication device during movement along the path, can communicate with the network node via consecutive reception radio lobes, wherein the consecutive reception radio lobes are located in a same direction as one another, wherein the same direction is one of a same direction as a direction of movement of the wireless communication device, and an opposite direction to the direction of movement of the wireless communication device; and determining that the wireless communication device is about to move out of a current reception radio lobe and move into a subsequent reception radio lobe and, as a consequence of said determination:

controlling at least one antenna node to provide an instruction at a specific point in time to the wireless communication device to perform a correction of transmission power, wherein the correction is adapted to account for a difference between a first and a second path loss associated with the current reception radio lobe and the subsequent reception radio lobe, respectively.

2. The method of claim 1, wherein the determination that the wireless communication device is about to move out of a current reception radio lobe and move into a subsequent reception radio lobe comprises:

determining a position of the wireless communication device, said position being in relation to an antenna node that maintains the current reception radio lobe and an antenna node that maintains the subsequent reception radio lobe.

3. The method of claim 1, wherein the instruction to the wireless communication device to perform a correction of transmission power comprises a new power control command in any of a physical downlink control channel (PDCHU), an enhanced physical downlink control channel (E-PDCCH), and a machine-type communications physical downlink control channel (M-PDCCH).

4. The method of claim 3, comprising:
determining the first path loss associated with the current reception radio lobe and the second path loss associated with the subsequent reception radio lobe and wherein the new power control command comprises a power correction value that is based on a difference between the first and the second path loss.

5. The method of claim 3, wherein the current reception radio lobe and the subsequent reception radio lobe are ahead of the wireless communication device and wherein:
said specific point in time to provide an instruction to perform a correction of transmission power is subsequent to a point in time when the wireless communication device leaves the current reception radio lobe; and
the power correction value is positive.

6. The method of claim 3, wherein the current reception radio lobe and the subsequent reception radio lobe are behind the wireless communication device and wherein:
said specific point in time to provide an instruction to perform a correction of transmission power is prior to a point in time when the wireless communication device enters the subsequent reception radio lobe; and
the power correction value is negative.

7. The method of claim 1, wherein the instruction to the wireless communication device to perform a correction of transmission power comprises a plurality of transmitter power control (TPC) commands in any of a physical downlink control channel (PDCCH), an enhanced physical downlink control channel (E-PDCCH), and a machine-type communications physical downlink control channel (M-PDCCH), wherein said TPC command comprises a power correction value of 4 dB.

8. The method of claim 7, wherein the current reception radio lobe and the subsequent reception radio lobe are ahead of the wireless communication device and wherein:
said specific point in time to provide an instruction to perform a correction of transmission power is such that the plurality of TPC commands are initiated subsequent to a point in time when the wireless communication device leaves the current reception radio lobe; and
the power correction value is positive.

9. The method of claim 7, wherein the current reception radio lobe and the subsequent reception radio lobe are behind the wireless communication device and wherein:
said specific point in time to provide an instruction to perform a correction of transmission power is such that the plurality of TPC commands are initiated is prior to a point in time when the wireless communication device enters the subsequent reception radio lobe; and
the power correction value is negative.

10. A network node configured to be connected to a plurality of antenna nodes that are located along a path where a wireless communication device is moving, the network node comprising:
input/output circuitry;
a processor; and
a memory, wherein said memory contains instructions executable by said processor whereby said network node is operative to:
control the antenna nodes to maintain a respective reception radio lobe along the path such that the wireless communication device during movement along the path, can communicate with the network node via consecutive reception radio lobes, wherein the consecutive reception radio lobes are located in a same direction as one another, wherein the same direction is one of a same direction as a direction of movement of the wireless communication device, and an opposite direction to the direction of movement of the wireless communication device; and
determine that the wireless communication device is about to move out of a current reception radio lobe and move into a subsequent reception radio lobe and, as a consequence of said determination:
control at least one antenna node to provide an instruction at a specific point in time to the wireless communication device to perform a correction of transmission power, wherein the correction is adapted to account for a difference between a first and a second path loss associated with the current reception radio lobe and the subsequent reception radio lobe, respectively.

11. The network node of claim 10, operative such that the determination that the wireless communication device is about to move out of a current reception radio lobe and move into a subsequent reception radio lobe comprises:
determining a position of the wireless communication device, said position being in relation to an antenna node that maintains the current reception radio lobe and an antenna node that maintains the subsequent reception radio lobe.

12. The network node of claim 10, operative such that the instruction to the wireless communication device to perform a correction of transmission power comprises a new power control command in any of a physical downlink control channel (PDCCH), an enhanced physical downlink control channel (E-PDCCH), and a machine-type communications physical downlink control channel (M-PDCCH).

13. The network node of claim 12, operative to:
determine the first path loss associated with the current reception radio lobe and the second path loss associated with the subsequent reception radio lobe and wherein the new power control command comprises a power correction value that is based on a difference between the first and the second path loss.

14. The network node of claim 12, operative such that the current reception radio lobe and the subsequent reception radio lobe are ahead of the wireless communication device and operative such that:
said specific point in time to provide an instruction to perform a correction of transmission power is subsequent to a point in time when the wireless communication device leaves the current reception radio lobe; and
the power correction value is positive.

15. The network node of claim 12, operative such that the current reception radio lobe and the subsequent reception radio lobe are behind the wireless communication device and operative such that:
said specific point in time to provide an instruction to perform a correction of transmission power is prior to a point in time when the wireless communication device enters the subsequent reception radio lobe; and
the power correction value is negative.

16. The network node of claim 10, operative such that the instruction to the wireless communication device to perform a correction of transmission power comprises a plurality of transmitter power control (TPC) commands in any of a physical downlink control channel (PDCCH)), an enhanced physical downlink control channel (E-PDCCH), and a machine-type communications physical downlink control channel (M-PDCCH), wherein said TPC command comprises a power correction value of 4 dB.

17. The network node of claim 16, operative such that the current reception radio lobe and the subsequent reception radio lobe are ahead of the wireless communication device and operative such that:

said specific point in time to provide an instruction to perform a correction of transmission power is such that the plurality of TPC commands are initiated subsequent to a point in time when the wireless communication device leaves the current reception radio lobe; and the power correction value is positive.

18. The network node of claim 16, operative such that the current reception radio lobe and the subsequent reception radio lobe are behind the wireless communication device and operative such that:

said specific point in time to provide an instruction to perform a correction of transmission power is such that the plurality of TPC commands are initiated is prior to a point in time when the wireless communication device enters the subsequent reception radio lobe; and the power correction value is negative.

19. A non-transitory computer readable storage medium comprising instructions which, when executed on at least one processor in a network node connected to a plurality of antenna nodes that are located along a path where a wireless communication device is moving, cause the network node to carry out a method comprising:

controlling the antenna nodes to maintain a respective reception radio lobe along the path such that the wireless communication device during movement along the path, can communicate with the network node via consecutive reception radio lobes, wherein the consecutive reception radio lobes are located in a same direction as one another, wherein the same direction is one of a same direction as a direction of movement of the wireless communication device, and an opposite direction to the direction of movement of the wireless communication device; and determining that the wireless communication device is about to move out of a current reception radio lobe and move into a subsequent reception radio lobe and, as a consequence of said determination:

controlling at least one antenna node to provide an instruction at a specific point in time to the wireless communication device to perform a correction of transmission power, wherein the correction is adapted to account for a difference between a first and a second path loss associated with the current reception radio lobe and the subsequent reception radio lobe, respectively.

* * * * *